(12) United States Patent
Riestra

(10) Patent No.: US 8,480,340 B2
(45) Date of Patent: Jul. 9, 2013

(54) HYDRAULIC NUT WITH ALARM SYSTEMS AND VARIABLE ARRANGEMENT OF ADVANCEMENT AND UNIT TOTAL ADVANCEMENT SCREWS THROUGH HEAD ROTATION WITH FLANGE SENSORS

(75) Inventor: Antonio Cami Riestra, Lleida (ES)

(73) Assignees: Luis Gerardo Oyervides Ochoa, Nuevo Leon (MX); Antonio Cami Riestra, Lleida (ES)

( * ) Notice: Subject to any disclaimer, the term of this patent is extended or adjusted under 35 U.S.C. 154(b) by 354 days.

(21) Appl. No.: 12/950,472

(22) Filed: Nov. 19, 2010

(65) Prior Publication Data

US 2011/0203424 A1  Aug. 25, 2011

(30) Foreign Application Priority Data

Feb. 22, 2010  (MX) .................. MX/a/2010/002060

(51) Int. Cl.
*F16B 31/00* (2006.01)
(52) U.S. Cl.
USPC ......... 411/14.5; 411/434; 254/29 A; 81/57.38
(58) Field of Classification Search
USPC   411/8, 14.5, 13, 14, 434; 254/29 A; 81/57.38
See application file for complete search history.

(56) References Cited

U.S. PATENT DOCUMENTS

| 2,571,265 | A | * | 10/1951 | Leufven | 411/434 |
| 3,947,948 | A | * | 4/1976 | Fredriksson et al. | 29/426.2 |
| 4,078,923 | A | * | 3/1978 | Richter | 430/41 |
| 4,182,215 | A | * | 1/1980 | Green et al. | 411/434 |
| 4,725,176 | A | * | 2/1988 | Connolly et al. | 411/427 |
| 4,927,305 | A | * | 5/1990 | Peterson, Jr. | 411/14 |
| 5,553,982 | A | * | 9/1996 | Hashikawa | 411/14 |
| 7,008,156 | B2 | * | 3/2006 | Imai et al. | 411/14.5 |
| 7,658,131 | B1 | * | 2/2010 | Rosa et al. | 81/57.38 |

* cited by examiner

*Primary Examiner* — Gary Estremsky
(74) *Attorney, Agent, or Firm* — Birch, Stewart, Kolasch & Birch, LLP

(57) ABSTRACT

Different embodiments of hydraulic nut are described comprising a pressure system with screws that may be displaced to an end detent, and once the travel of the screw has finished, there is no possibility of a further forward movement thereof, so there cannot be a hydraulic fluid leakage. The hydraulic wrench of the present invention may be used in a preventive way, since the nut may indicate a decrease or increase in the preset stress to which it must operate, or it may indicate that the stress at which it must be installed has been reached. For example, the nut may comprise a visual alarm device, an acoustic alarm device or it may issue a warning signal through phototransistors or radiofrequency.

24 Claims, 19 Drawing Sheets

HYDRAULIC NUT WITH ALARM SYSTEMS AND VARIABLE ARRANGEMENT OF ADVANCEMENT AND UNIT TOTAL ADVANCEMENT SCREWS THROUGH HEAD ROTATION WITH FLANGE SENSORS

TECHNICAL FIELD OF THE INVENTION

Hydraulic nuts requiring different hydraulic devices, such as hydraulic pumps through connection sockets, supply hoses and gauges in order to be actuated (starting) are known in the art, whereby the pressure to be applied in order to obtain the desired tension is set.

This kind of nut is used in various industrial applications, particularly in the oil industry, as well as in the industry of fluid and gas management, and in general in any application that uses big pipes.

In the nut of the present invention, said devices and elements are not necessary since the nut itself provides an indication of the tension to be applied through a gauge or completion or failure device, through a light signal, a sound signal, a phototransistor signal, a radiotransmitter signal, or a visually perceptible signal.

BACKGROUND OF THE INVENTION

Nuts with direct torque screws over a tempered washer are well-known in the art, these nuts have direct torque screws over a tempered washer which are tightened through a torque wrench in order to make the summation of forces of each of the screws over the supporting base, thus stretching the stud of each screw and generating a tension therein.

Hytorc CLAMP nuts (Unex Corporation) are also known in the art, wherein a sleeve, a bush and a washer perform a similar function to that of stretching the screw stud, where a hydraulic torque wrench is required in order to obtain a preset pressure.

The hydraulic nuts available in the market often have the issue of exceeding the measure of stress of the nut body indicated by the manufacturer upon injecting the hydraulic fluid, and also the part that performs the function of pull knob, so the parts separate loosing the fluid and getting disabled.

U.S. Pat. No. 7,063,490, describes a hydraulic nut having a screw, which is movable in a fluid chamber of a nut body and which has a radial protrusion from the screw and a displacement bar mounted on the protrusion. The displacement bar overlies the nut body and extends past the nut body by an amount equal to the distance through which the hydraulic nut is to move a bearing assembly along a tapered shaft or move an adapter sleeve, or removal sleeve with bearing assembly on them.

U.S. Pat. No. 4,182,215, describes hydraulic prestressing nuts for setting a tensile stress in a bolt. The invention involves a nut body wherein an annular screw is arranged to be hydraulically extended from a bottom face thereof against a plate, head, platen, or the like, elevating the nut and extending the bolt therewith. A concentric loading ring is arranged with the nut body for turning into engagement with the place, such that when the loading ring is so extended, it provides a rigid columnar support to the annular piston. Tensile stress on the bolt is maintained by the loading ring. The nut of the present invention further involves a failsafe arrangement for providing a backup repressurization capability consisting of a second piston arrangement that can be independently pressurized at a primary seal failure, extending the primary piston therewith.

BRIEF DESCRIPTION OF THE INVENTION

The nuts from the present invention, in contrast to the prior art, don't need any torque outer equipment or pressure generating equipment in order to be able to tighten them to a given stress. That is, the user doesn't require using further equipment, or knowing anything about torques, but only to stop the grip when a gauge device and torque failure warning indicates that the adequate torque has been reached, for example through a warning element such as a LED that turns on, a chromatic signal that is displayed or the issuance of a signal sent through phototransistors or radiotransistors.

In a first embodiment, the hydraulic nut of the present invention is manually threaded in a screw. Once the hydraulic nut is threaded, the casing is re-tightened with a Stillson wrench or bolt, proceeding with the manual threading, followed by a further tightening of the hydraulic nut with a Stillson wrench, or any other type of wrench which allows for rotation.

In a second and third embodiments of the invention, and in contrast to the nuts of the prior art, the nuts of the present invention comprise a pressure system with one or more screws, either horizontal or vertical, which may be displaced to an end detent, and once the screw stroke has ended there is no possibility of a further forward movement thereof, so there may not be hydraulic fluid leakages. The length of the screws and their screw thread determine the forward movement in (mm) and the speed at which the end elongation is obtained.

The nuts of the present invention are calibrated at the plant through the gauge and failure warning device. The hydraulic nut may be calibrated through a calibration and torque failure warning device to accurate, specific values. For example, if the calibration and torque failure warning device is intended to generate a warning upon the occurrence of a problem in the threaded coupling, such as a progressive elongation, a fracture or a loss of stress of the threaded coupling, a value may be set for the drive of the calibration and torque failure warning device, so that, for example, in the face of a stress loss or increase of a 5%, 8%, 10%, or any other appropriate percentage, the calibration and torque failure warning device is actuated. For example, if the calibration and failure warning device is calibrated so that a warning element, for example a LED, is turned on before the 5% elongation, the device generates a warning of said problem, but there won't be still any accident caused by any fracture or loosening, since a 5% doesn't involve threats to the coupling, besides, a lock nut may be available.

The hydraulic wrench of the present invention may be used in a preventive way, since the nut may indicate a decrease or increase in the preset stress to which it must operate, or it may indicate that the stress at which it must be installed has been reached. For example, the nut may comprise a visual alarm device, an acoustic alarm device or a phototransistor or radiofrequency devices may issue a warning signal.

In every embodiment of the invention, the hydraulic fluid may be any fluid adequate for being used in tools or hydraulic devices, for example hydraulic oil.

The nuts of the present invention are useful in applications that require a tightening of the threaded coupling at a specific stress, for example in the threaded coupling used for coupling flanges, but they may be used in any application that requires a threaded coupling.

BRIEF DESCRIPTION OF THE DRAWINGS

The present invention will become more evident from the following description when taken in connection with the accompanying drawings, wherein.

DETAILED DESCRIPTION OF THE INVENTION

Figure 1:
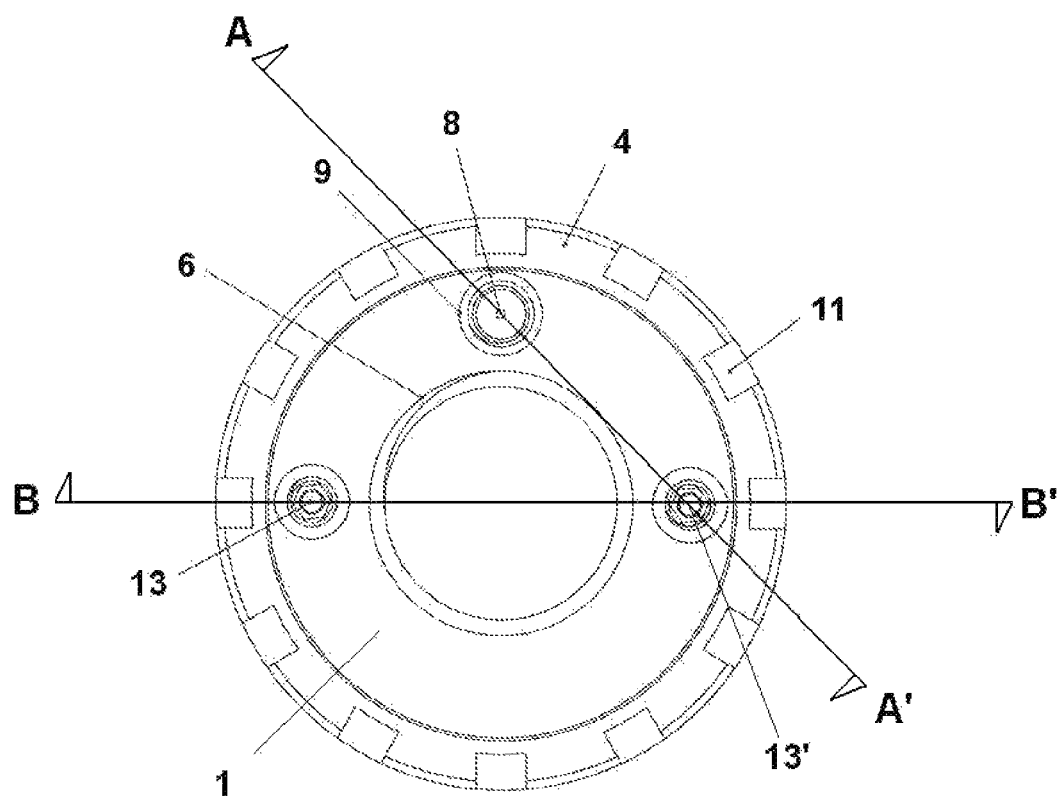
FIG. 1 shows a first embodiment of the hydraulic wrench of the invention in top view.

In a first embodiment illustrated in FIGS. 1 through 7, the hydraulic wrench comprises the following elements:
1. Casing
2. Screw seal
3. Casing seal
4. Clamping threaded nut
5. Special thread (detail)
6. Shank-screw body
7. Bushing screw
8. Calibration and failure warning device
9. Calibration and failure warning device casing
10. Casing torque hole
11. Depressions (for the rotation wrench of the clamp nut)
12. Calibration and failure warning device casing holes
13. Cap screw for the ball valve
14. Micropiston for calibration and failure warning device casing
15. Driving bolts sleeve/screw
16. Spring for the calibration and failure warning device
17. Hydraulic fluid pressure chamber
18. Axial bearing
19. Contact thrust shaft
20. Micropiston collar
21. Hydraulic fluid gallery
22. Thrust shaft O-ring
23. Hydraulic fluid filling, purging and control ball valve
24. Locknut (second configuration)

The hydraulic wrench of the first embodiment is manually threaded to a screw. Once the hydraulic nut is threaded, the casing is re-tightened with a Stillson wrench or bolt, proceeding with the manual threading, followed by a further tightening of the hydraulic nut with a Stillson wrench, or any other type of wrench which allows for rotation.

Figure 2:
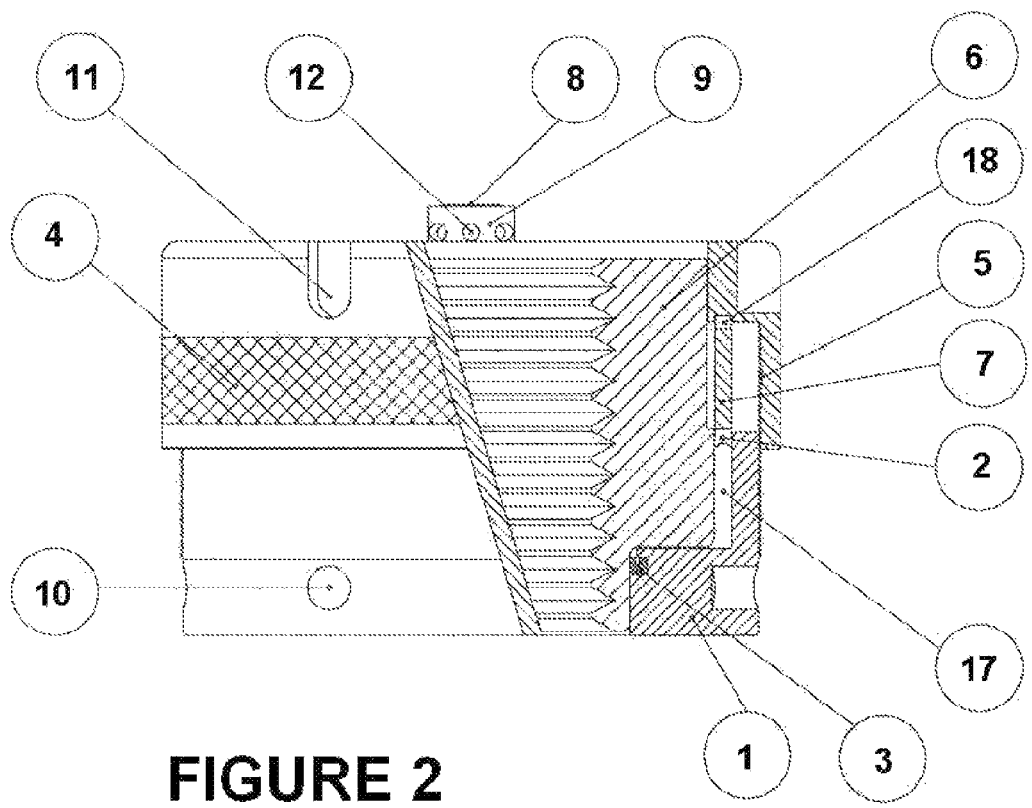
FIG. 2 shows the first configuration of the first embodiment of the hydraulic wrench of the invention, in partial cross-sectional cut, at the starting position.
Figure 3:
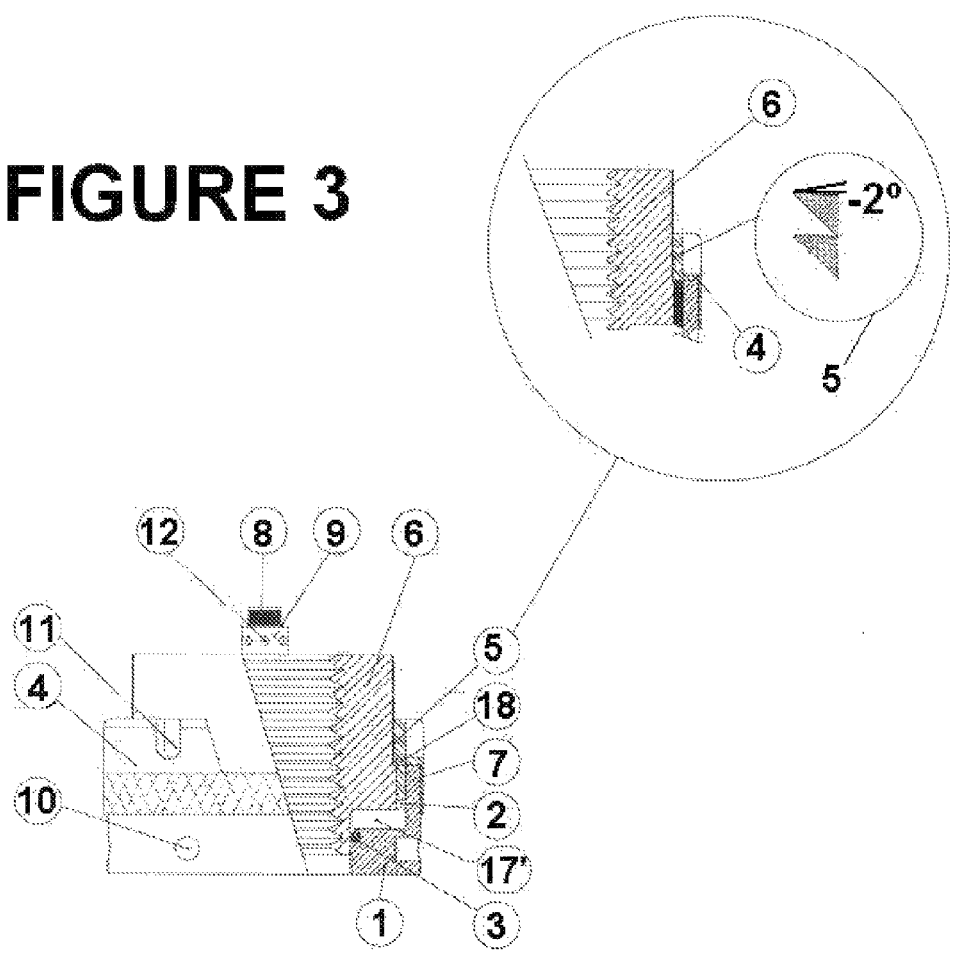
FIG. 3 shows the first configuration of the first embodiment of the hydraulic wrench of the invention, in partial cross-sectional cut, at the ending position.
Figure 4:
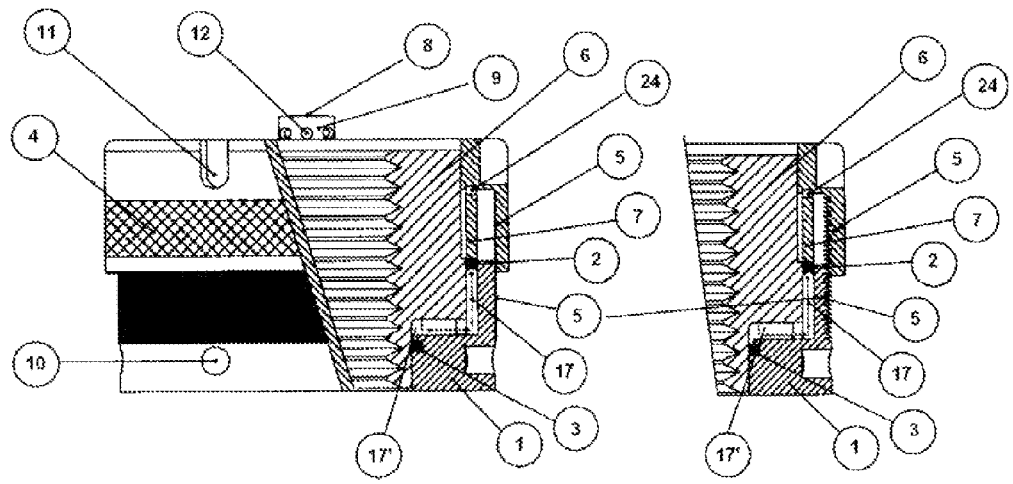
FIG. 4 shows the second configuration of the first embodiment of the hydraulic wrench of the invention, in partial longitudinal cut, at the starting position.
Figure 5:
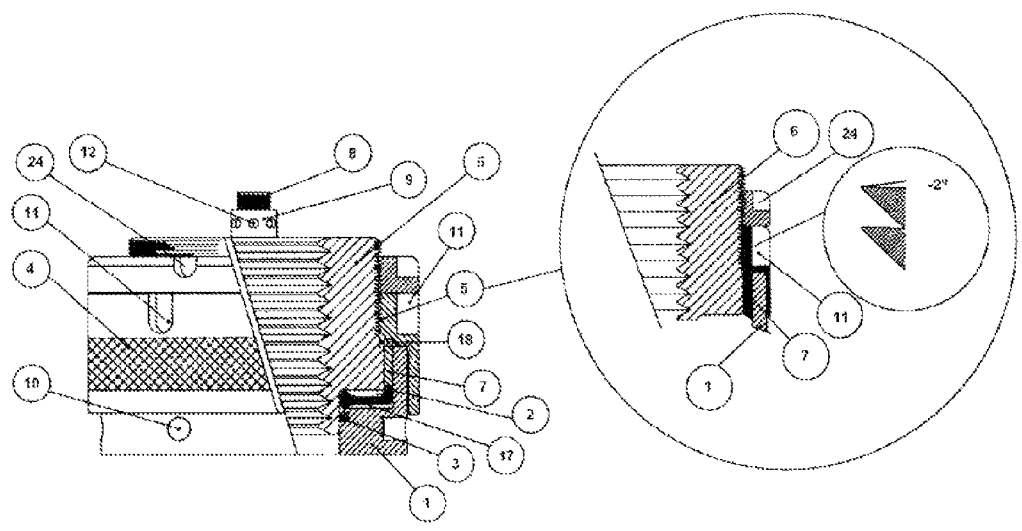
FIG. 5 shows the second configuration of the first embodiment of the hydraulic wrench of the invention, in partial longitudinal cut, at the ending position.

The hydraulic wrench may be used in two configurations, in the first configuration, illustrated in FIGS. 2 and 3, in the body (6), and in the second configuration, illustrated in FIGS. 4 and 5, the hydraulic wrench is threaded in the casing (1). In the second configuration, a locknut (24) is also available, while in the first configuration the same hydraulic nut acts as locknut. In both configurations the bushing piston (7), with the aid of an axial bearing (18), moves over the collar (2), which, besides being a moisturetight seal, acts as head for the hydraulic fluid (17) pressure chamber.

The hydraulic wrench includes a drive special threading (5) over the casing (1), or over the pressure threaded nut (4) depending on the configuration to be used.

As illustrated in FIGS. 2 and 3, upon manual threading of the hydraulic wrench from the position of FIG. 2 to the position of FIG. 3, the hydraulic fluid is displaced from the chamber (17) into the hydraulic fluid chamber (17') of greater diameter, stretching the body (6) upwards, which while in contact with the screw where the hydraulic wrench is going to be threaded, it stretches it, that is, it tightens it.

Figure 6:
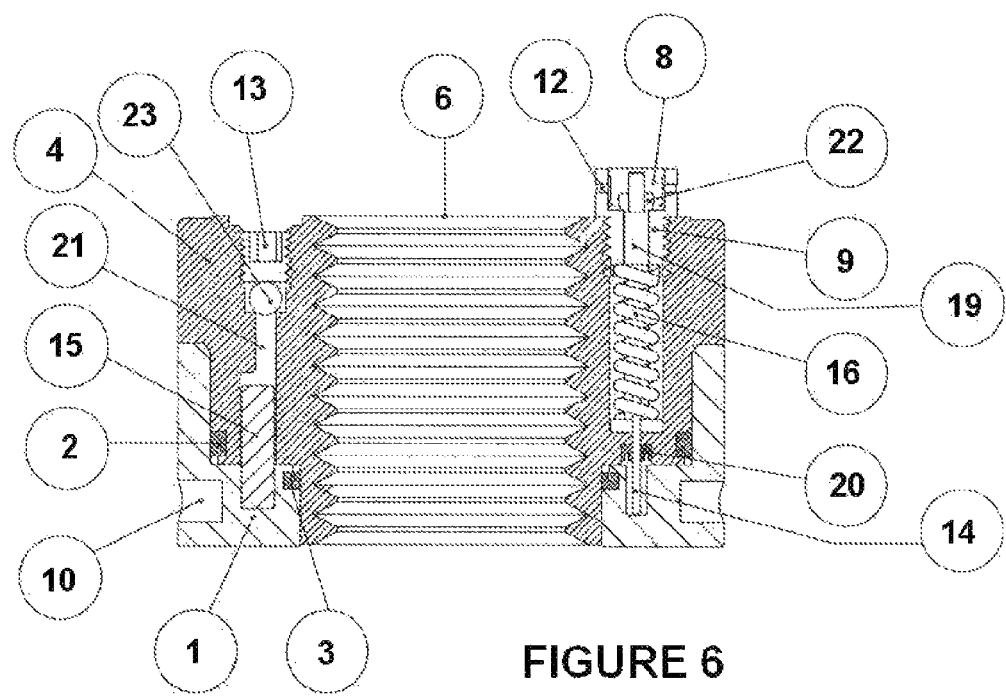
FIG. 6 shows the first embodiment of the hydraulic wrench of the invention, in cross section along the A-A' line of FIG. 1.
Figure 8:
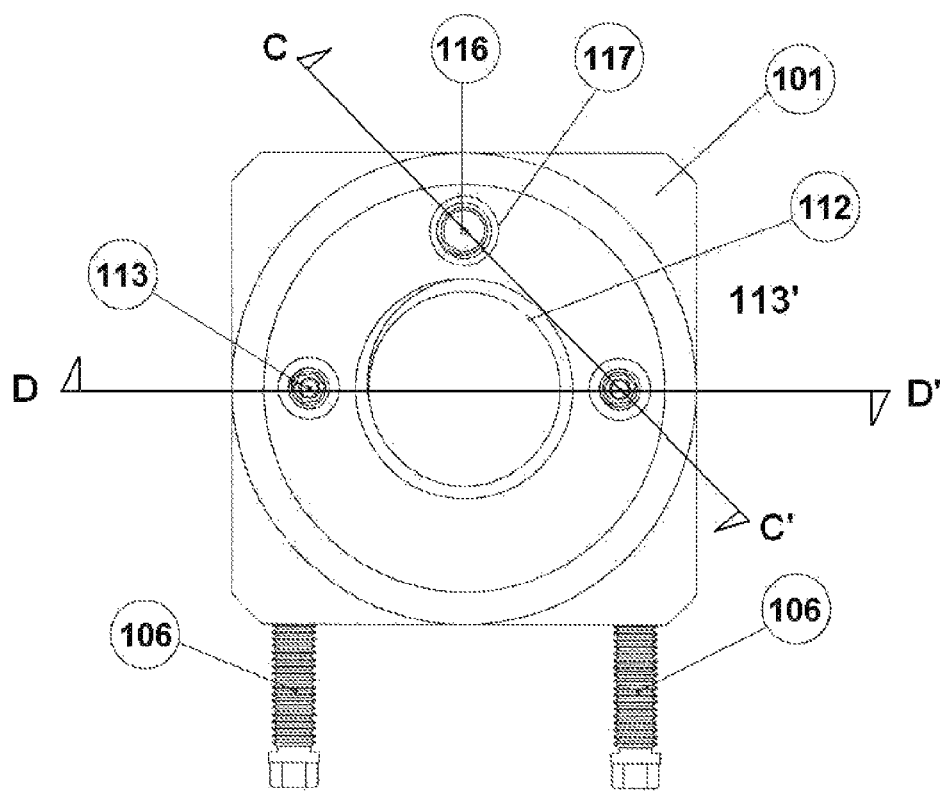
FIG. 8 shows a second embodiment of the hydraulic wrench of the invention in top view.
Figure 9:
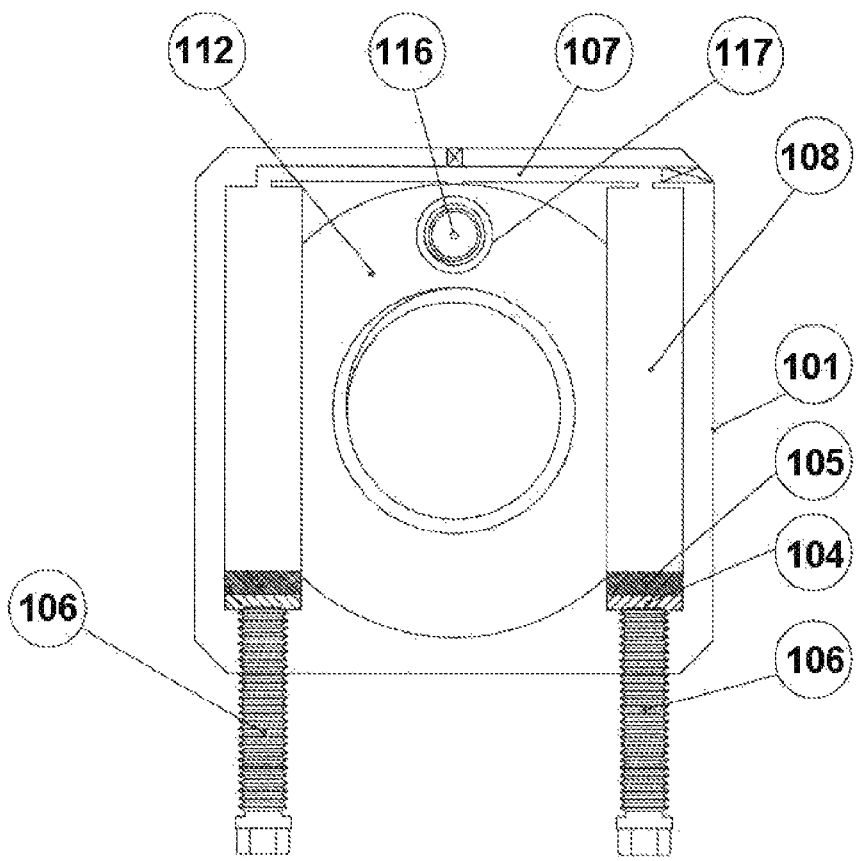
FIG. 9 shows the second embodiment of the hydraulic wrench of the invention, in longitudinal cut.

At the same time, as illustrated in FIGS. 6 and 8, the micropiston (14) for the calibration and failure warning device (8) displaces the contact thrust shaft (19), which in turn drives the mechanical calibration and failure warning device (8). Upon reaching the end mark or warning, the preset tension has been reached.

The hydraulic wrench comprises a casing (1), a seal (3), a variable number of holes (10) (only one is illustrated), two blind holes in order to house two bolts (15), a shank-screw body (6), with a seal (2) having two symmetrical holes with respect to the casing (1), which house the casing (1) driving bolts (15) and the shank-screw body (6), and a clamp threaded nut (4) having a plurality of depressions (11).

In FIG. 1, the hydraulic wrench is illustrated, wherein the plurality of depressions is twelve, and two ball valve cap screws (13, 13').

Figure 7:
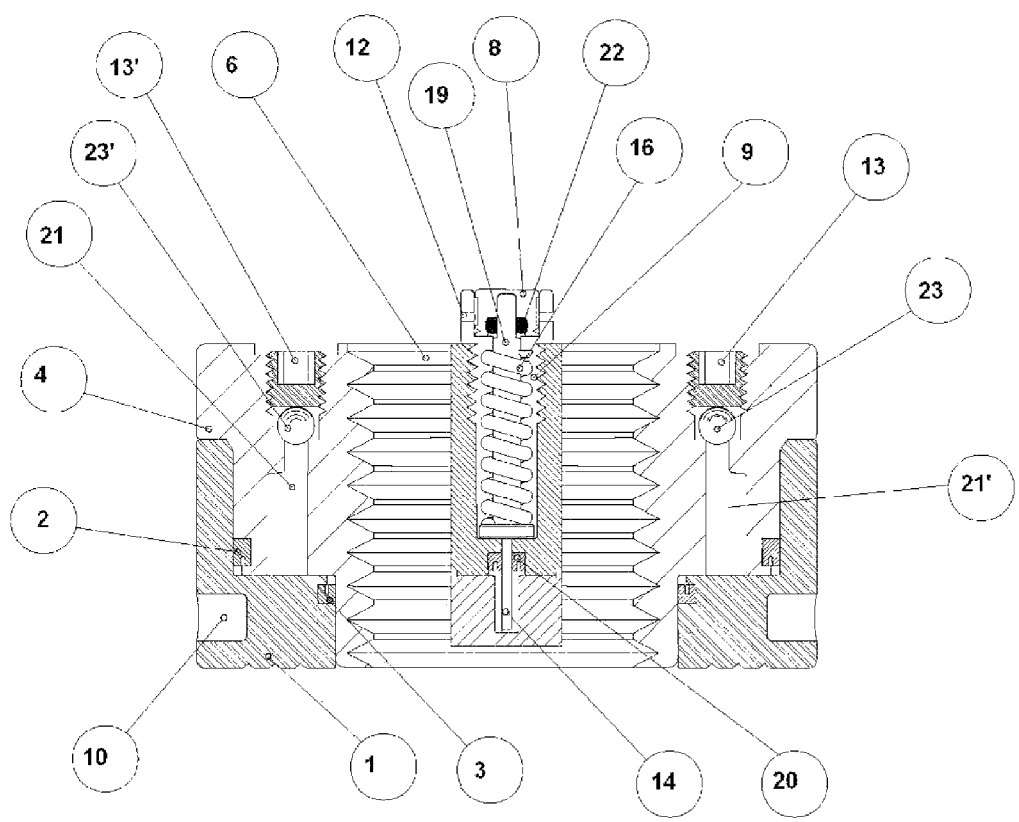
FIG. 7 shows the first embodiment of the hydraulic wrench of the invention, in cross section along the B-B' line of FIG. 1.

In reference to FIG. 7, the shank-screw body (6) is illustrated, two galleries (21, 21') which are each coupled to a ball valve (23, 23'), and two cap screws (13, 13') through which the hydraulic fluid is supplied.

In order to operate the hydraulic wrench, in reference to FIGS. 2 and 3, the clamp nut (4) or special supply head in a screw or pin where the nut is going to be threaded is first manually threaded, through a Stillson or similar wrench which is capable of rotating the nut through the holes (10), which act as supporting point for the Stillson wrench.

The hydraulic wrench of the first embodiment may have two forward movement configurations:

In the first configuration, FIGS. 2 and 3, the clamp nut (4) is threaded on the casing (1). Once the threading is completed, the axial bearing roller (18) is urged to abut over the seal (2), which besides acting as moisturetight seal performs the function of a piston head. As the clamp nut (4) is being threaded, the hydraulic fluid contained in the chamber (17) is moved to the chamber (17'), which is of greater diameter. In this way, the hydraulic fluid forces the shank-screw body (6) to be displaced upwards, and once it is threaded on the screw or pin where the hydraulic wrench is placed, it stretches.

The detail of the thread shown in FIGS. 2 to 5 is an illustrative example, since other types of thread may be adopted. As illustrated in FIGS. 3 and 5, said example shows two negative grades of slope, whereby the pressure forces the nut to execute the inward force, instead of outward such as in a normal thread.

In this first configuration, a safety nut is not required because in case of a tension drop, the body (5) tending to go down would lay on the casing (1) thus avoiding the strain of the threaded coupling.

As illustrated in FIGS. 4 and 5, in the second configuration of the first embodiment, the clamp nut (4) is threaded on the shank-screw body (6), instead of the casing (1), as in the first configuration.

Upon threading the clamp nut (4) over the shank-screw body (6) it abuts against the axial bearing roller (18) that thrusts the seal (2), which, besides acting as a moisturetight seal, performs the function of piston head, and upon continuing threading the clamp nut (4), the hydraulic fluid contained in a chamber (17) is displaced into a chamber (17'), which is of greater diameter, thrusting thus the shaft body (6), which is threaded to the coupling screw to move upwards, and thus to stretch the coupling screw.

At first, the locknut (24) is completely unthreaded, and is threaded once the adequate tension has been supplied to the nut, and is re-tightened with a Stillson wrench through the holes (11).

The locknut (24) performs the function of keeping the coupling threaded when a loss of hydraulic pressure occurs, while the locknut (24) lies on the main casing (1). As illustrated in FIG. 5, if there is a tension drop, the coupling screw, when threaded on the threaded body (5), may not move downwards since the locknut (24), being threaded on the threaded body (5) in its downward movement, encounters the casing (1), which directly abuts on the flange base where the threaded coupling lies.

Therefore, the locknut (24) must be completely unthreaded before placing the hydraulic wrench in the coupling screw, because in case of being threaded, it may break said locknut upon exerting pressure, since the body (5) in its upward movement, would encounter it and deform it.

The micropiston (14), on increasing the chamber (17') pressure, begins to move upwards due to the pressure exerted on its end, which acts as a normal piston. Upon its upward movement, it drags the contact pusher (19) which in turn drives the calibration and failure warning device (8).

FIGS. 6 and 7 include a through hole (21), which at its threaded top portion houses the calibration and failure warning device (8) casing (9), which has a plurality of holes (12), a micropiston (14), a spring (16), a contact thrust shaft (19), a collar (20) with an O-ring (22), a mechanical calibration and failure warning device (8), a bushing screw (7) and an axial bearing (18).

A mechanic calibration and failure warning device (8) may be used, but it is also possible to include other warning elements such as a LED light, an acoustic signal generator, a phototransistor or a radio frequency emitter, whereby the drive of the calibration and failure warning device results in the LED turn on, or the transmission of a signal to an adequate medium for reception thereof.

In case of a tension drop in the threaded coupling due to a loss of tension, breakage or stretching of the screw, the calibration and failure warning device (8) moves downwards, getting into the calibration and failure warning device (8) casing, whereby a signal indicating an anomaly may be generated.

In a second embodiment illustrated in FIGS. 8 through 13, the hydraulic wrench comprises the following elements:
- 101. Casing
- 102. Sleeve seal
- 103. Casing-screw-thread seal
- 104. Anti-extrusion washer
- 105. Screw collar
- 106. Set screw
- 107. Hydraulic fluid gallery
- 108. Screw pressure chamber
- 109. Shaft pressure chamber
- 110. Locknut
- 111. Holes for tightening locknut
- 112. Threaded body (shaft screw)
- 113. Ball valve cap screw
- 114. Filling, purging, control ball valve
- 115. Hydraulic fluid gallery
- 116. Calibration and failure warning device
- 117. Calibration and failure warning device casing
- 118. Calibration and failure warning device casing tightening holes
- 119. Driving bolts
- 120. Holes for the driving bolts
- 121. Spring for the contact thrust shaft
- 122. Threaded casing for the contact thrust shaft
- 123. Calibration and failure warning device casing tightening holes
- 125. Thrust shaft O-ring
- 126. Micropiston moisturetight collar
- 127. Micropiston for calibration and failure warning device
- 128. Blind hole of casing
- 129. Contact pusher shaft for calibration and failure warning device The hydraulic wrench according to this embodiment includes two or more horizontal driving screws. The following description refers to a single screw. However, it is understood that two or more screws may be used.

The hydraulic wrench illustrated in FIG. 8 is manually threaded in the coupling screw corresponding to the threaded coupling, and afterwards by a stationary wrench or any other type of wrench, the casing (101), whose base is square, is re-tightened. For example, in a flange, once the hydraulic wrench is manually threaded, a manual re-threading is done with a stationary wrench, a Stillson wrench or any other type of wrench which may be adapted to the rectangular base of the nut so that it is fixed to the reception base of the flange.

Figure 10:
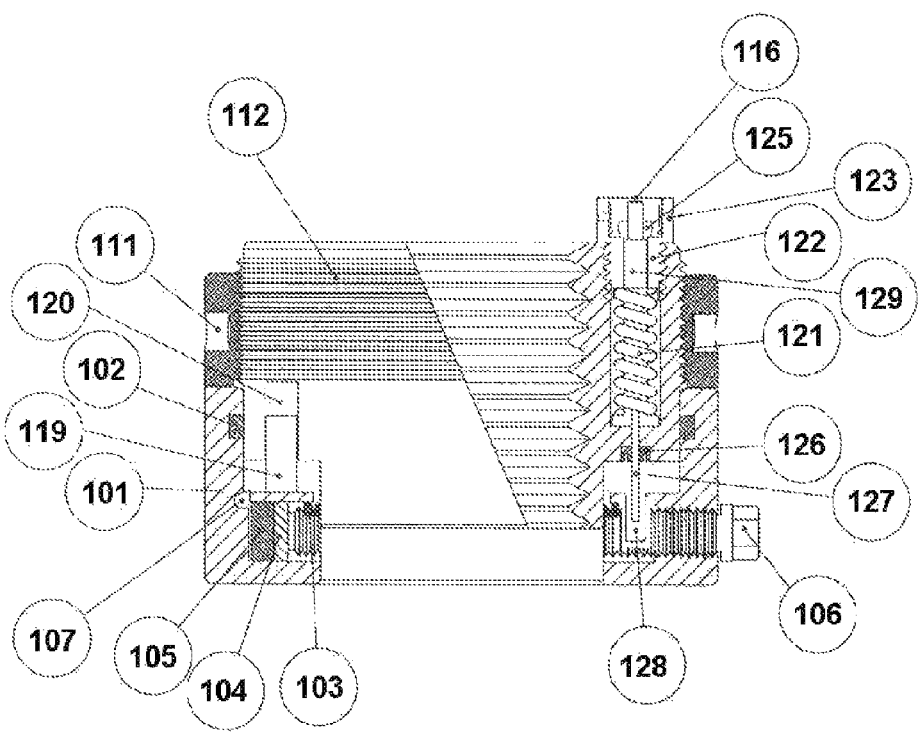
FIG. 10 shows the second embodiment of the hydraulic wrench of the invention, in cross section along the C-C' line of FIG. 8.
Figure 11:
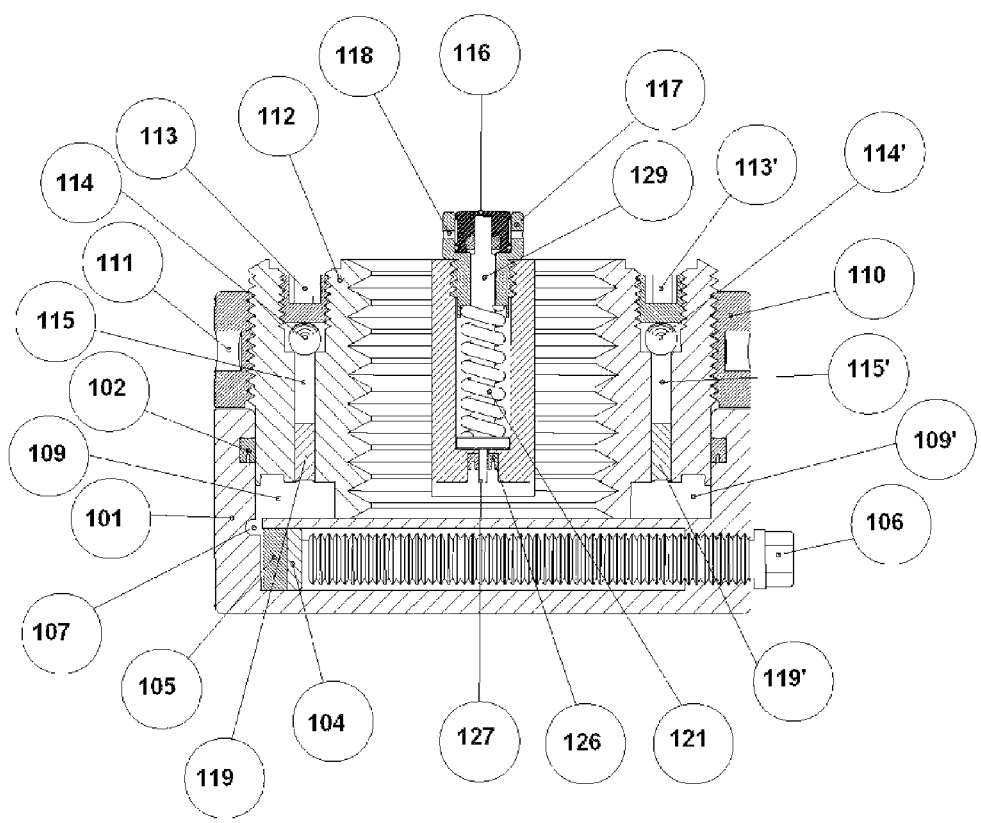
FIG. 11 shows the second embodiment of the hydraulic wrench of the invention, in cross section along the D-D' line of FIG. 8.
Figure 12:
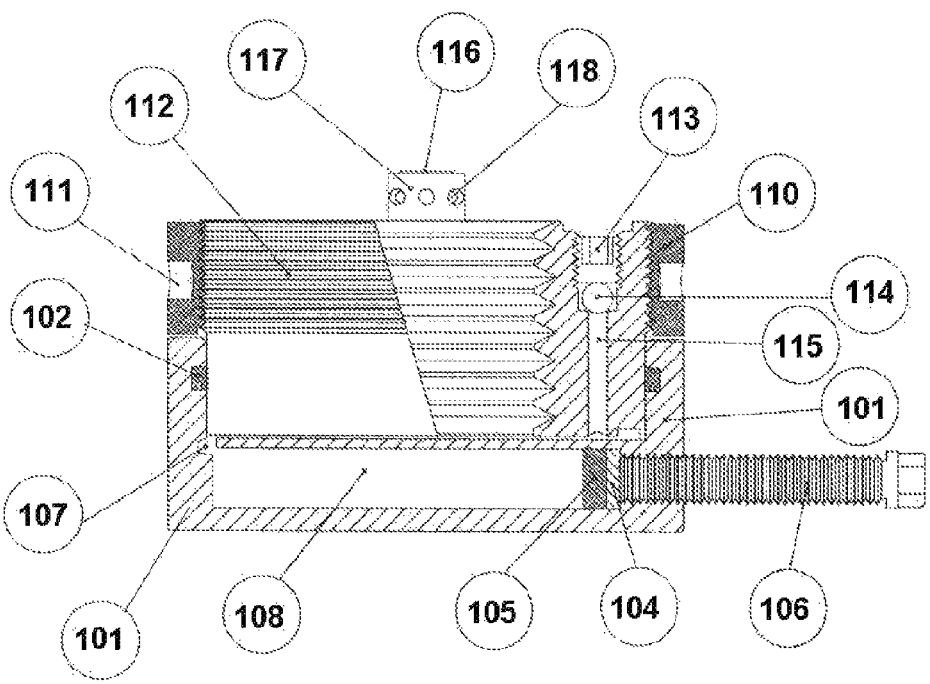
FIG. 12 shows the second configuration of the hydraulic wrench of the invention, in partial cross-sectional cut, at the starting position.
Figure 13:
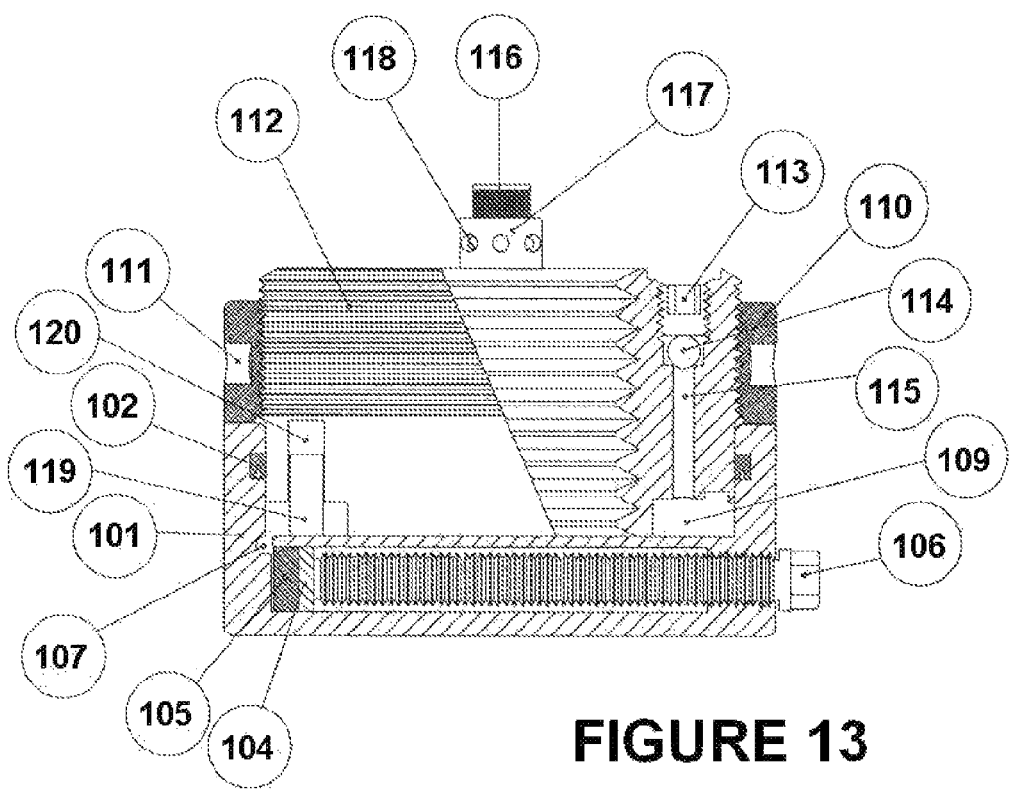
FIG. 13 shows the second configuration of the hydraulic wrench of the invention, in partial cross-sectional cut, at the ending position.

As illustrated in FIGS. 10 to 13, by tightening the screws (106), through a stationary, ratchet or any other type of wrench which allows for a clockwise rotation, the screw collar (105) and the screw anti-extrusion washer (104) move while they compress the hydraulic fluid. In FIG. 12, the hydraulic fluid goes from the chamber (108) into the general chamber formed by the casing (101) and the threaded body (112). As shown in FIGS. 10 and 11, every turn of the screw further compresses the fluid in such a way that the micropiston (114) will raise as the threaded body (112) begins to stretch the screw to which the hydraulic wrench is coupled, while the casing (101) abuts against the screw base.

As its names indicates, the anti-extrusion washer (104) prevents the screw (106) collar (105), which also performs the function of piston head, from deteriorating due to the effect of very high pressure. That is, said tempered and annealed washer is housed behind the collar (105) with an adequate tolerance so that the pressure doesn't extrude the collar (105), between the tolerance between the wall gallery where the collar (105) moves and the anti-extrusion washer (104) wall. In case that such tolerance is great, a very high pressure would extrude into the screw (106) thus breaking the collar and the seal.

At first, the locknut (110) is completely unthreaded, and is threaded once the adequate tension has been supplied to the nut, and it is re-tightened with a Stillson wrench through the holes (111).

The locknut (110) performs the function of keeping the coupling threaded when a loss of hydraulic pressure occurs, when the locknut (110) lies on the main casing (101). As illustrated in FIG. 10, if there is a tension drop, the coupling screw, when threaded on the threaded body (112), may not move downwards since the locknut (110), being threaded on the threaded body (112) in its downward movement, encounters the casing (101), which directly abuts on the flange base where the threaded coupling lies.

Therefore, the locknut (110) must be completely unthreaded before placing the hydraulic wrench in the coupling screw, because when threaded, upon exerting pressure it may break said locknut, since the body (112) in its upward movement would encounter it and deform it.

In the course of screw tightening (106) a point is reached when the micropiston (127) drags the contact thrust shaft (129) until it makes the termination chromatic cylinder visible (116) and marked as high, or if applicable turning on a LED light, or a radiotransmitter or phototransistor, in that moment the tightening is stopped due to the fact that the preset tension force has been reached.

The hydraulic wrench with horizontal drive screws comprises at least one screw (106), but it is possible to use more screws with the same configuration, depending on the distance required for stretching the screw where the hydraulic wrench is coupled.

As illustrated in FIGS. 8 to 13, the hydraulic wrench with horizontal screws comprises a casing (101), which has two non-through holes in its lower portion in order to be able to insert two driving bolts (119) which will be housed in two holes (120), whose function is to avoid that the casing (101) and the threaded body (112) rotate freely among them. The threaded body (112) has two inserts in order to be able to house a moisturetight sleeve seal (102), and another moisturetight seal (103) of the casing-sleeve-screw in order to create a moisturetight volume between the casing (101) and the threaded body (112), see FIGS. 10 and 11.

The body inner threading (112) has the same type of thread as the screw where the hydraulic wrench is to be coupled. The body (112) also has at its outer top portion a threaded portion in order to be able of mounting a locknut (110) having at least four non-through holes (111), which perform the function of tightening the locknut (104) with a hook wrench. The threaded body (112) has a variable number of pressure chambers (108), which communicate with the casing (101), whose inner part houses a collar (105) that performs the function of moisturetight collar and also of screw heads. A tempered anti-extrusion washer (104) adjusted to the pressure chamber (108) is located between the collar (105) and the set screw (106).

The starting portion of the pressure chamber (108) has a threaded portion in order to be able to thread the screw (106) which has the function of moving forward the collar (105) and the washer (104).

As illustrated in FIGS. 10 y 11, the threaded body (112) has a threaded hole at its top portion in order to mount the threaded casing of the contact thrust shaft (129). The threaded body (112) has through holes (115, 115') which act as communication gallery with the chambers (109, 109'), and which perform the function of hydraulic fluid filling, purging and control. At its upper portion, the galleries (115, 115') include a threading for placement of a screw-cap (113 or 113') which presses a ball valve (114, 114') in its interior for the filling and purging control and subsequent closing of the hydraulic wrench.

The threaded body (116) has a threaded hole with an upper part that is threaded for housing the contact thrust shaft (129) nut (122). The contact thrust shaft (129) has a spring (121) for regulating its hoisting length, a micropiston (127) which is responsible for hoisting the contact thrust shaft (129) and a moisturetight collar (126).

The casing (101) has a blind hole (128) which allows the micropiston (127) to avoid abutting on the casing (101) in its downward displacement.

The micropiston (127) upon increase in the chamber (109') pressure begins to move upwards due to the pressure exerted on its end, which acts as a normal piston. Upon its upward movement, it drags the pusher (129) which in turn drives the calibration and failure warning device.

Upon its upward movement, the contact thrust shaft (129), activates the calibration and failure warning device (124) which may be mechanical, LED light, or radiotransmitter or phototransistor.

Figure 14:
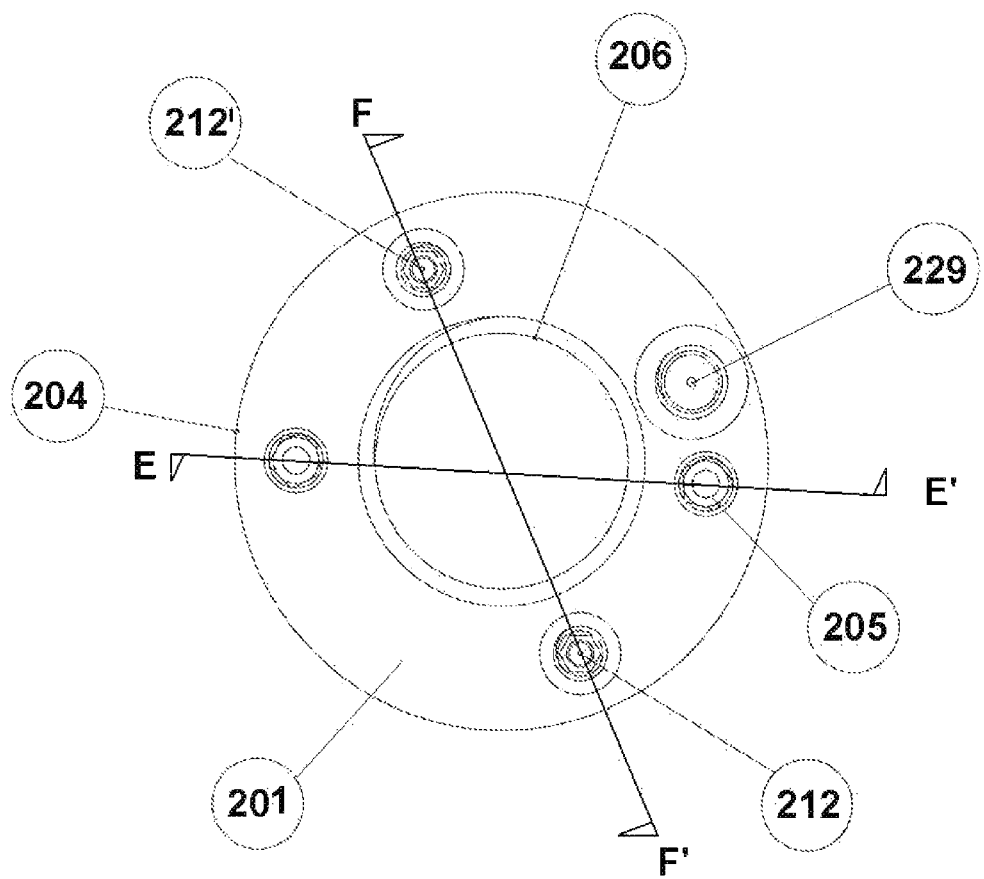
FIG. 14 shows a third embodiment of the hydraulic wrench of the invention in top view.
Figure 15:
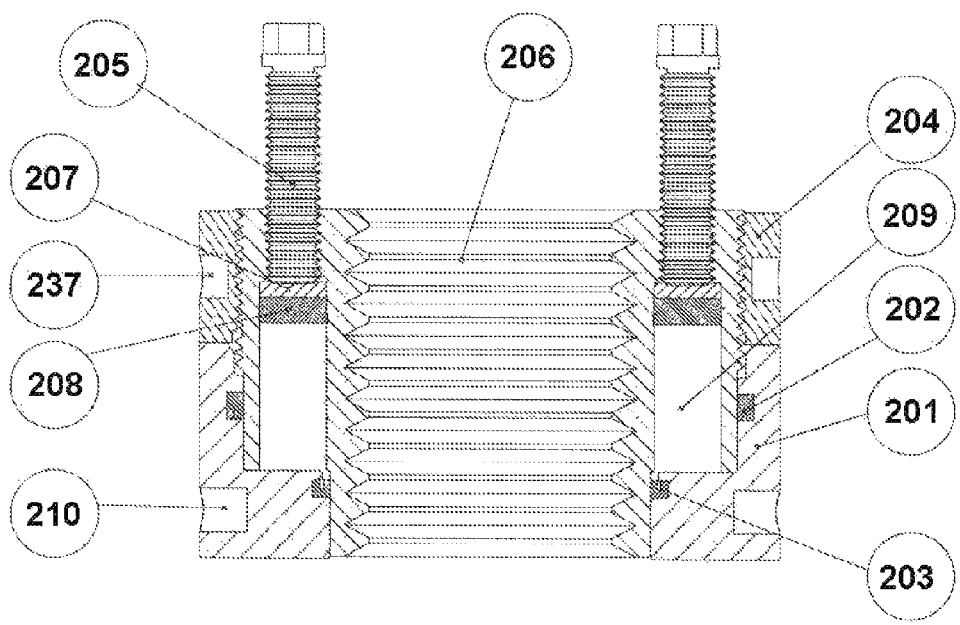
FIG. 15 shows the third embodiment of the hydraulic wrench of the invention, in cross section along the E-E' line of FIG. 14.
Figure 16:
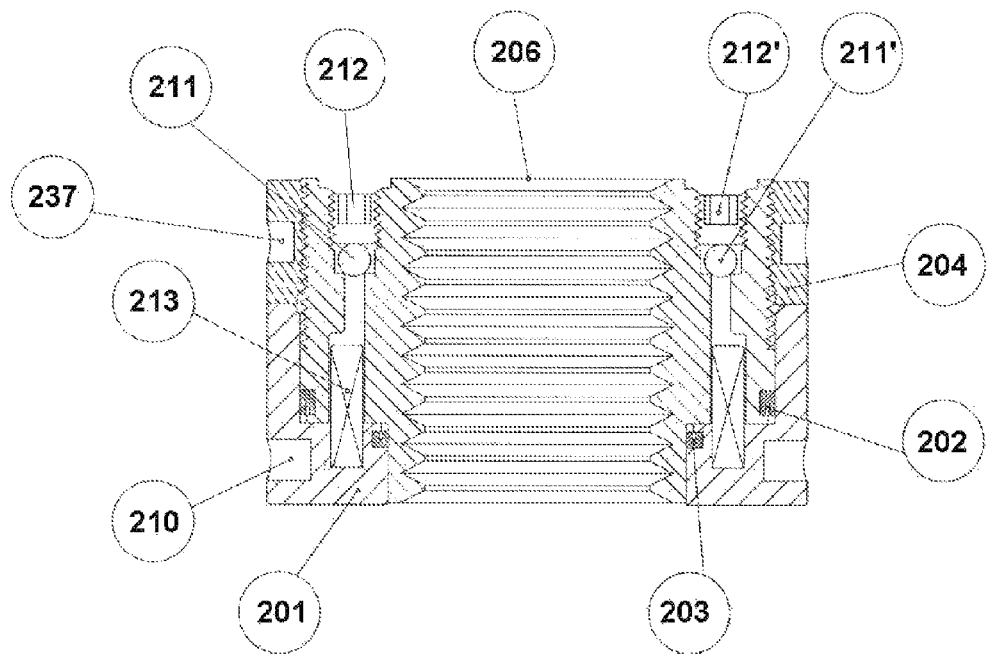
FIG. 16 shows the third embodiment of the hydraulic wrench of the invention, in cross section along the F-F' line of FIG. 14.

In a first embodiment illustrated in FIGS. 14 through 16, the hydraulic wrench comprises the following elements:

201. Main casing
202. First moisturetight seal
203. Second moisturetight seal
204. Locknut
205. Set screw
206. Threaded body (shaft piston)
207. Anti-extrusion washer
208. Screw collar
209. Pressure chamber
210. Casing tightening holes
211. Fluid filling valve
212. Valve cap screw
213. Driving bolts
214. Micropiston for calibration and failure warning device
215. Calibration and failure warning device screw collar
216. Spring for the contact thrust shaft
217. Contact thrust shaft
218. Threaded casing for the contact thrust shaft
219. Isolated bolt stop (switch)

The hydraulic wrench according to the third embodiment includes two or more vertical driving screws. The following description refers to a single screw. However, it is understood that two or more screws may be used.

The hydraulic wrench with vertical drive screws comprises at least one screw (205), but it is possible to use more screws with the same configuration, depending on the distance required for stretching the screw where the hydraulic wrench is threaded.

The hydraulic wrench illustrated in FIG. 14 is manually threaded in the corresponding threaded coupling screw, and afterwards through a Stillson or similar wrench, the casing (201) is re-tightened using the holes (210) as supporting point for the Stillson wrench.

In reference to FIGS. 15 and 16, initially the locknut (204) is completely unthreaded, and is threaded once the adequate tension has been exerted in the nut, and it is re-tightened with a Stillson wrench through the holes (237). The locknut (204) performs the function of keeping the coupling threaded when a loss of hydraulic pressure occurs, when the locknut (204) lies on the main casing (201). The locknut (204) operates under the same principles as those of the locknut (104) from the first and second embodiments.

By tightening the screw (205) with a stationary wrench, ratchet wrench or any other kind of wrench which allows a clockwise turn, the screw (205) collar (208) and the washer (207) compress the hydraulic fluid, passing the fluid of the chamber (209) into the general chamber formed by the support (201) and the threaded body (206). Each turn of the screw further compresses the fluid, so that a micropiston operating as the micropiston (127) of the second embodiment is lifted while the threaded body (206) stretches the screw, while the support (201) acts as a support over the screw base.

The hydraulic wrench comprises a casing (201) having in its lower portion a variable number of holes (210), which allow the casing (201) to be stretched, two non-through holes in the inner part of the casing (201) for inserting two driving bolts (213) which are introduced in the two holes of the threaded body (206), whose function is to prevent the casing (201) and the threaded body (206) from freely rotating among them. The threaded body (206) has two inserts for housing a first moisturetight seal (202) and a second moisturetight seal (203) with the purpose of creating a moisturetight volume between the casing (201) and the threaded body (206).

The inner threading of the body (206) has the same type of thread as the screw where the hydraulic wrench is to be coupled; further having at its outer top portion a threaded portion which allows to couple a locknut (204), which has at least four non-through holes (237) which perform the function of tightening the locknut (204) with a hook wrench. The threaded body (206) having several through holes (209) which communicate with the casing (201) and perform the function of pressure chamber, in which inner part a screw collar (208) is housed, the screw collar performing the function of moisturetight collar and also of screw head. A tempered anti-extrusion washer (207) adjusted to the pressure chamber (209) is located between the collar (208) and the set screw (205). The lower portion of the pressure chamber (209) having a threaded portion in order to be able to thread the screw (205) which has the function of moving forward the collar (208) and the washer (207). The threaded body (206) having a threaded hole at its upper part for housing the contact thrust shaft (217) threaded casing (218).

The threaded body (206) has through holes (212, 212') which communicate with the casing (201) and having the function of controlling, filling and purging the hydraulic fluid. These holes (212, 212') have, each in its inner part, a valve (211) for the control of the filling, purging and subsequent closing of the hydraulic wrench.

In the course of screw tightening (205) a point is reached when the micropiston (214) drags a contact thrust shaft (129) until it drives a calibration and visual failure warning device (229) which may consist of a LED light, a radiotransmitter, phototransistor, etc. In that moment the tightening is stopped because the preset tension force will been reached by then. The calibration and failure warning device from the micropiston to the LED, is the same as that described and illustrated in the second embodiment.

The threaded body (206) at its threaded upper portion houses a nut (218) of the contact thrust shaft (217). The contact thrust shaft (217) having a spring (216) for regulating its hoisting length, a screw (214) which is responsible for hoisting the contact thrust shaft (217) and a moisturetight collar (215).

The thrust shaft (217) in its upward movement is in charge of driving the calibration and failure warning device, be it mechanical visual (229), light visual, radiofrequency and photofrequency.

Figure 17:
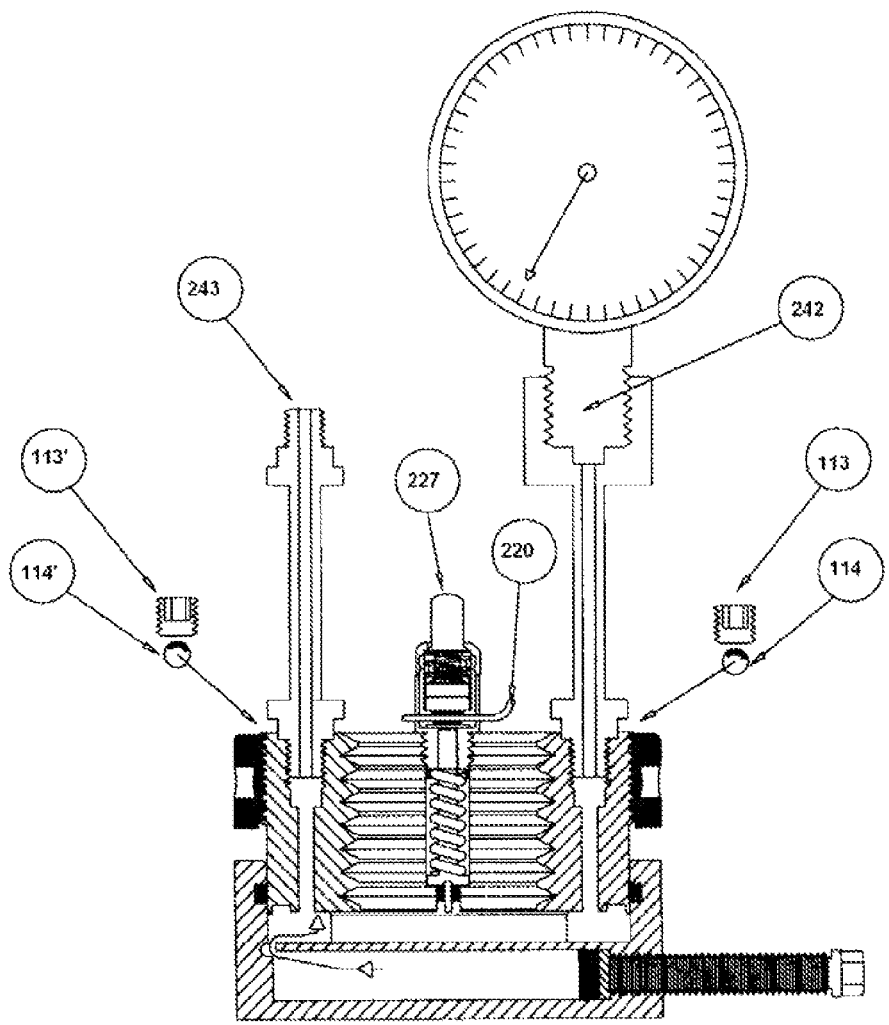
FIG. 17 is a side view of an embodiment of the calibration and failure warning device, in longitudinal cut.

FIG. 17 schematically illustrates the way in which the tension at which the hydraulic nuts of the invention operate is preset. Since the hydraulic area is known, that is the effective area (mm$^2$) of force upon which the hydraulic fluid acts (pressure by surface provides force), it is known that by applying a determined pressure, a tension which is directly proportional is obtained. The hydraulic wrench may be calibrated in such a way that the generated tension is accurately known. In order to preset the tension, for example in the embodiment of horizontal screws that has been already illustrated, the ball valve cap screw (113) and the ball from the filling ball valve (114) are removed and a control gauge (242) is connected. Afterwards, the cap screw of the ball valve (113') and the ball from the filling ball valve (114') are removed and a coupling hydraulic pipe (243) is threaded to a pump which provides the fluid necessary to fill the hydraulic wrench, besides calibrating the calibration and warning device. Since the pressure exerted by the gauge (242) is known, the hydraulic fluid urges the micropiston (127) which in turn urges the thrust shaft (129) thus compressing the spring (121).

As illustrative non-restrictive example, if a maximum pressure of 1500 bar is desired to be preset, and if the working hydraulic area is known, the tension generated, for example 25 tons, is known. In this way, once determining that the micropiston (127) has a stroke of 4 mm (its diameter determines its displacement), upon exerting a pressure of 1500 bar (this stroke may be the same in any size of nut) the force of the spring (121) is the element to be varied depending on the tension intended to be preset. The spring (121) is varied by substitution, that is, it is replaced by a spring which provides the appropriate force.

Therefore, in this example, the micropiston travel must always be 4 mm in order to activate the warning element, for example a LED (227), without damaging it. Therefore, the element to be varied for performing different tensions is the spring (121). If a lower tension is intended to be preset, for example 20 tons, the pressure to be exerted is also lower in order to generate less tension: this is achieved through a spring (121), which will have to exert less force in order to obtain the 4 mm of displacement to activate the LED (227).

Figure 18:
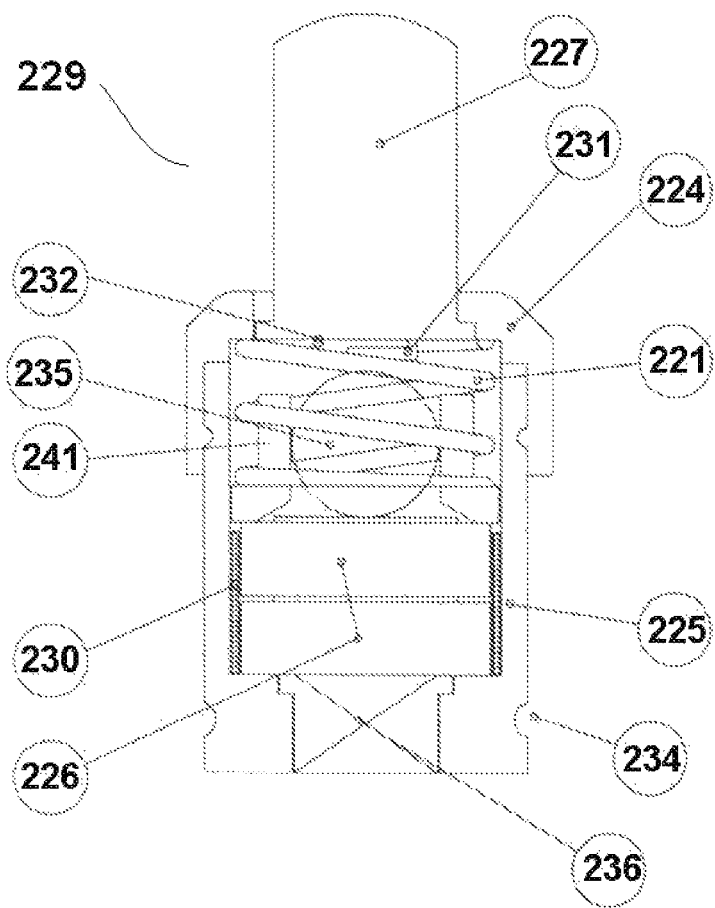
FIG. 18 is a side view of a second embodiment of the calibration and failure warning device, in longitudinal cut.
Figure 19:
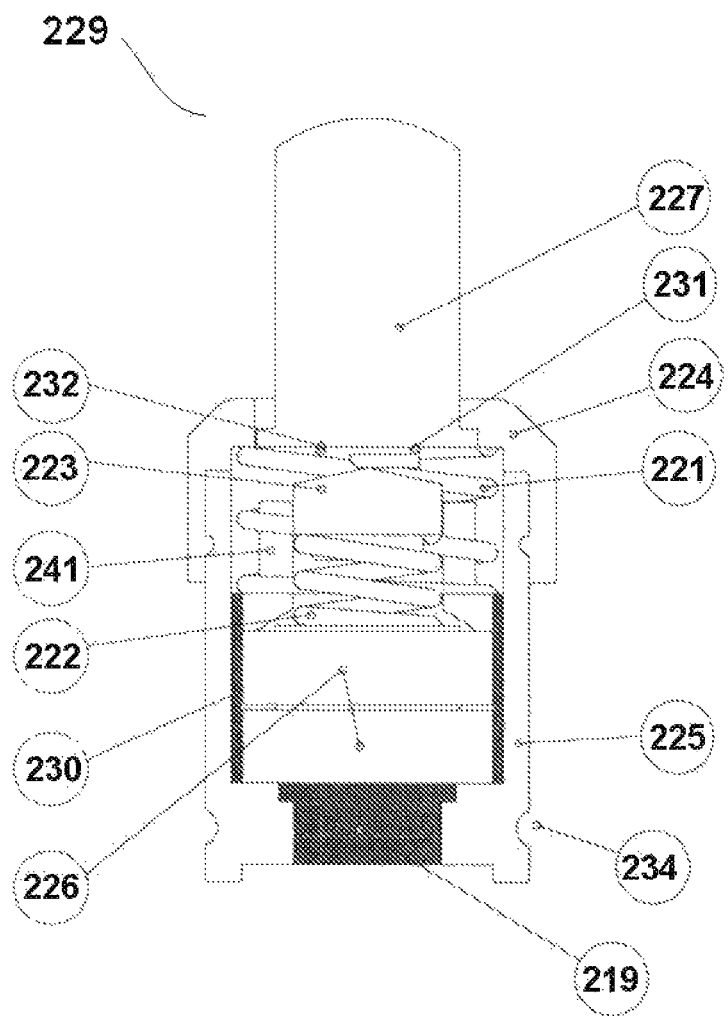
FIG. 19 is a schematic view of the way in which the stress at which the hydraulic wrench operates is preset.

FIGS. 18 and 19 illustrate two embodiments of the calibration and failure warning device of the present invention, comprising the following elements:

220. Metal clamping ring
221. Power battery backward spring
222. Contact backward spring
223. Positive pole LED contact
224. LED casing
225. Power battery casing
226. Power battery
227. Light-emitting diode (LED)
228. Calibration and visual failure warning device O-ring
229. Calibration and visual mechanical failure warning device
230. Insulation protection
231. LED's positive pole 232. Power battery negative pole
233. Casing hole
234. Hole for metal clamping ring
235. Contact ball
236. Calibration and failure warning device detent axis-bolt
237. Holes for tightening locknut
238. Filling, purging, control holes
239. Calibration and failure warning device through hole
240. Holes for the driving bolts
241. Insulation guide bush The calibration and failure warning devices described below may be used with any of the configurations and embodiments of the hydraulic nuts described above.

In an embodiment, the calibration and failure warning device may be luminous, and it may operate as a torque gauge element and as a permanent sentry.

As shown in FIG. 18, in order to perform the calibration function, the warning device comprises a detent bolt (236), one or more power batteries (226) located within the power batteries casing (225), an insulating material (230) which insulates power batteries (226) from the casing (225). The casing (225) has a notch (234) for inserting a clamping ring (220) into the thrust shaft nut, for example the contact thrust shaft (19) of the second embodiment of the hydraulic nut or the contact thrust shaft (217) of the third embodiment of the hydraulic nut.

The casing (224) houses a light-emitting diode (LED) (227) and a spring (221) which is guided by the insulation bush (241), which also guides the contact ball (235). The LED (227) has a positive contact (231) connected to the power battery (226) through the contact (223) and the spring (22), and a negative contact (232) coupled to the casing (224).

When the thrust shaft of the hydraulic wrench moves upwards, it forces the detent bolt (236) to raise, which in turn forces the power batteries (226) to also move forward together with the contact ball (235), which makes the contact of the power batteries (226) with the positive pole (231) from the LED (227). In this way, the LED emits an ending light, which indicates that the hydraulic wrench has reached a preset tension on the screw.

Once the preset tension on the screw has been reached, the clamping ring (220) is removed in order to be able of taking the calibration warning device out and mounting the permanent warning device which will act as a sentry and will alert about the occurrence of a tension drop in the threaded coupling.

In reference to FIG. 19, in order to perform the function of permanent sentry, the warning device comprises a insulation detent bolt (219) which acts as switch, one or more power batteries (226) insulated by a casing (225) material (230), a spring (221) which forces to keep the power batteries (226) in position within the casing (225), and the casing (224) contacts a negative pole (232) located in said casing. A bush (241) acts as guide for the spring (221), the positive contact (223) and the spring (222), always make contact with the positive pole (231) of the LED (227).

The notch (234) of the casing (225) has the function of clamping the assembly to the thrust shaft nut of the hydraulic wrench by a metal clamping ring (220).

When the thrust shaft of a hydraulic nut according to the present invention descends, the insulation detent bolt (219), which is in contact with the power batteries (226) and the LED's (227) positive pole (231), also descends because of the force exerted by the spring (221) and the spring (222), which causes the power batteries (226) to contact the casing (225), thus closing the circuit and energizing the LED (227), turning it on.

When the hydraulic wrench exhibits a tension drop caused by bolt stretching, leakage, etc., the hydraulic wrench micropiston begins to descend, causing the bolt (219) to descend and energize the LED (227).

The thrust shaft length of the hydraulic wrench determines the point where the LED (227) is light up.

A mechanical advertising sign device may also be used instead of an illuminated advertising sign, which upon the occurrence of a tension drop, a marked chromatic cylinder descends, remaining hidden in the thrust shaft threaded casing of the hydraulic wrench, thus warning about the failure.

The calibration and failure warning devices may be used interchangeably, that is, an illuminated device (LED 227) may be used for calibration, and then a mechanical visual warning device (229) may be mounted as sentry.

Alternatively, a warning device may be used through a phototransistor, which operates in the same way as the illuminated device with the LED (227), but upon activation, instead of emitting an illuminated sign in order to be displayed, it emits a photosignal which is received by an adequate receiving media.

A radiotransmitter may also be used, which operates in the same way as with the LED (227), but upon activation instead of emitting an illuminated signal, it emits a radio signal which is received by an adequate receiving media, and which may forward the signal to any intended place.

Therefore, those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hydraulic nut comprising:
   a casing (1);
   two blind holes for housing two bolts (15) and two galleries (21, 21') which are connected each with a ball valve (23, 23');
   a shank-screw body (6), with a seal (2);
   a threaded clamp nut (4) having a plurality of depressions (11);
   two ball valve cap screws (13, 13') through which the hydraulic fluid is supplied;
   wherein upon threading the clamp nut (4) on the casing (1), it forces an axial bearing roller (18) to abut against a seal (2), which apart from being a moisturetight seal, it performs the function of piston head, and as the clamp nut (4) threading continues, the hydraulic fluid contained in a chamber (17) is displaced into a chamber (17'), which is of greater diameter, whereby the hydraulic fluid forces the shank-screw body (6) to be displaced upwards, thus stretching.

2. The hydraulic wrench of claim 1, further comprising a through hole (21), which houses a micropiston (14), a spring (16), a contact thrust shaft (19), a collar (20), an O-ring (22), and in its top threaded portion it houses a calibration and failure warning device (8) casing (9);
   wherein upon increase in the chamber pressure (17') the micropiston (14) is displaced upwards thus forcing the contact thrust shaft (19) to be displaced and activate the calibration and failure warning device (8).

3. The hydraulic wrench of claim 2, wherein the calibration and failure warning device comprises:
   a casing (224);

a detent bolt (236), one or more power batteries (226) located within the power batteries casing (225), an insulating material (230) which insulates the power batteries (226) from the casing (225);

the power battery casing (225) has a notch (234) for inserting a clamping ring (220) into the thrust shaft nut (19) of the hydraulic wrench;

the casing (224) houses a warning element (227) and a spring (221) which is guided by an insulation bush (241), which also guides the contact ball (235);

the warning element (227) has a positive contact (231) connected to the power batteries (226) through a contact (223) and a spring (221), and a negative contact (232) coupled to the casing (224);

wherein when the thrust shaft (19) of the hydraulic wrench moves upwards, it forces the detent bolt (236) to raise, which in turn forces the power batteries (226) to also move forward along with the contact ball (235), performing the contact of the power batteries (226) with the positive pole (231) of the warning element (227), to be turned on.

4. The hydraulic wrench of claim 3, wherein the warning element comprises a LED, an acoustic signal generator, a chromatic cylinder, a phototransistor or a radiofrequency emitter.

5. The hydraulic wrench of claim 3, wherein the thrust shaft (19) length of the hydraulic wrench determines the point where the warning element (227) is to be turned on.

6. The hydraulic wrench of claim 2, wherein the calibration and failure warning device comprises:

a casing (224);

a insulation detent bolt (219), which acts as switch, one or more power batteries (226) insulated by a casing (225) material (230) of the power batteries (225);

a spring (221) which forces to keep the power batteries (226) in position within the casing (225), the casing (224) contacts a negative pole (232) located in said casing (224);

a bush (241) acting as guide for the spring (221), the positive contact (223) and the spring (222) always making contact with a positive pole (231) of the warning element (227);

wherein when the thrust shaft (19) of the hydraulic wrench moves downwards, the insulation detent bolt (219) in contact with the power batteries (226) and the positive pole (231), the warning element (227), also moves downwards due to the force exerted by the spring (221) and the spring (222), which causes the power batteries (226) to make contact with the casing (225), thus energizing the warning element (227).

7. The hydraulic wrench of claim 6, wherein the warning element comprises a LED, and acoustic signal generator, a chromatic cylinder, a phototransistor or a radiofrequency emitter.

8. The hydraulic wrench of claim 6, wherein the thrust shaft (19) length of the hydraulic wrench determines the point where the warning element (227) is turned on.

9. The hydraulic wrench of claim 1, wherein in order to preset the tension and calibrating the calibration and warning device, the ball valve cap screws (113 y 113') and the balls from the filling ball valves (114 y 114') are removed, a coupling hydraulic pipe (243) is threaded to a pump which provides the fluid necessary to fill the hydraulic wrench, and the spring force (121) is set, depending on the tension intended to be preset.

10. A hydraulic nut comprising:

a casing (1);

two blind holes for housing two bolts (15) and two galleries (21, 21') which are connected each with a ball valve (23, 23');

a shank-screw body (6), with a seal (2);

a threaded clamp nut (4) having a plurality of depressions (11);

two ball valve cap screws (13, 13') through which the hydraulic fluid is supplied;

a locknut (24);

wherein upon threading the clamp nut (4) on the shank-screw body (6), it abuts against an axial bearing roller (18) which forces the seal (2), which apart from being a moisturetight seal, it performs the function of piston head, and as the clamp nut (4) threading continues, the hydraulic fluid contained in a chamber (17) is displaced into a chamber (17'), which is of greater diameter, whereby the hydraulic fluid forces the shank-screw body (6) to be displaced upwards, thus stretching.

11. The hydraulic wrench of claim 10, wherein the locknut (24) is threaded over the threaded body (6) once the appropriate tension has been supplied to the nut, and is re-tightened with a Stillson wrench through the holes (11), whereby the locknut (24) keeps the coupling threaded upon the occurrence of a hydraulic pressure drop, as the locknut (24) lies on the main casing (1).

12. The hydraulic wrench of claim 10, wherein the hydraulic fluid is hydraulic oil.

13. A hydraulic nut comprising:

a casing (101), having two non-through holes for inserting two driving bolts (119, 119') which are housed in two holes (128), preventing the casing (101) and a threaded body (112) to freely rotate among them;

the two non-through holes further comprising two galleries (115, 115') which are each connected to a ball valve (114, 114');

two ball valve cap screws (113, 113') through which the hydraulic fluid is supplied, through the galleries (115 y 115') and the ball valves (114, 114'), into a chamber (108);

at least one horizontal set screw (106);

the threaded body (112) having two inserts in order to be able to house a moisturetight sleeve seal (102), and another moisturetight seal (103) of the casing-sleeve-screw in order to create a moisturetight volume between the casing (101) and the threaded body (112);

the body (112) also having at its outer top portion a threaded portion in order to be able of mounting a locknut (110) having at least four non-through holes (111), which perform the function of tightening the locknut (104) with a hook wrench;

the threaded body (112) having a variable number of pressure chambers (108), which communicate with the casing (101), whose inner part houses a collar (105) that performs the function of moisturetight collar and also of screw heads;

a tempered anti-extrusion washer (104) adjusted to the pressure chamber (108) which is located between the collar (105) and the set screw (106);

el set screw (106) which upon being threaded moves forward the collar (105) and the washer (104), compressing hydraulic fluid passing through a chamber (108) into a general chamber formed by the casing (101) and the threaded body (112), stretching the screw where the hydraulic wrench is to be coupled, while moving forward a micropiston (127) which in turn raises the contact thrust shaft (129).

14. The hydraulic wrench of claim 13, comprising two or more horizontal set screws (106).

15. The hydraulic wrench of claim 13, further comprising a through hole, which houses the micropiston (127), a spring (121), a contact thrust shaft (129), a collar (126), an O-ring (125), and housing at its top threaded portion a calibration and failure warning device (116) casing (117);
   wherein upon increase in the chamber pressure (109') the micropiston (14) is displaced upwards thus forcing the contact thrust shaft (19) to be displaced and activate the calibration and failure warning device (8).

16. The hydraulic wrench of claim 15, wherein the calibration and failure warning device comprises:
   a casing (224);
   a detent bolt (236), one or more power batteries (226) located within the power batteries casing (225), an insulating material (230) which insulates the power batteries (226) from the casing (225);
   the power battery casing (225) has a notch (234) for inserting a clamping ring (220) into the thrust shaft nut (19) of the hydraulic wrench;
   the casing (224) houses a warning element (227) and a spring (221) which is guided by an insulation bush (241), which also guides the contact ball (235);
   the warning element (227) has a positive contact (231) connected to the power batteries (226) through a contact (223) and a spring (221), and a negative contact (232) coupled to the casing (224);
   wherein when the thrust shaft (19) of the hydraulic wrench moves upwards, it forces the detent bolt (236) to raise, which in turn forces the power batteries (226) to also move forward along with the contact ball (235), which performs the contact of the power batteries (226) with the positive pole (231) of the warning element (227), to be turned on.

17. The hydraulic wrench of claim 16, wherein the warning element comprises a LED, and acoustic signal generator, a chromatic cylinder, a phototransistor or a radiofrequency emitter.

18. The hydraulic wrench of claim 16, wherein the thrust shaft (129) length of the hydraulic wrench determines the point where the warning element (227) is turned on.

19. The hydraulic wrench of claim 18, wherein the warning element comprises a LED, and acoustic signal generator, a chromatic cylinder, a phototransistor or a radiofrequency emitter.

20. The hydraulic wrench of claim 13, wherein the calibration and failure warning device comprises:
   a casing (224);
   a insulation detent bolt (219), which acts as switch, one or more power batteries (226) insulated by a casing (225) material (230) of the power batteries (225);
   a spring (221) which forces to keep the power batteries (226) in position within the casing (225), the casing (224) contacts a negative pole (232) located in said casing (224);
   a bush (241) acting as guide for the spring (221), the positive contact (223) and the spring (222), always making contact with a positive pole (231) of the warning element (227);
   wherein when the thrust shaft (19) of the hydraulic wrench moves downwards, the insulation detent bolt (219), which is in contact with the power batteries (226) and the positive pole (231), the warning element (227), also moves downwards due to the force exerted by the spring (221) and the spring (222), which causes the power batteries (226) to make contact with the casing (225), thus energizing the warning element (227).

21. The hydraulic wrench of claim 20, wherein the thrust shaft (129) length of the hydraulic wrench determines the point where the warning element (227) is turned on.

22. The hydraulic wrench of claim 13, wherein the hydraulic fluid is hydraulic oil.

23. The hydraulic wrench of claim 13, further comprising a locknut (110 or 204) which is threaded over the threaded body (112 or 206) once the appropriate tension has been supplied to the nut, and is re-tightened with a Stillson wrench through the holes (111 or 210), whereby the locknut (110 or 204) keeps the coupling threaded upon the occurrence of a hydraulic pressure drop, as the locknut (110 or 210) lies on the main casing (101 or 201).

24. A hydraulic nut comprising:
   a casing (101), having two non-through holes for inserting two driving bolts (119, 119') housed in two holes (128), which prevent the casing (101) and a threaded body (112) to freely rotate among them;
   the two non-through holes further comprising two galleries (115, 115') which are each connected to a ball valve (114, 114');
   two ball valve cap screws (113, 113') through which the hydraulic fluid is supplied, through the galleries (115 y 115') and the ball valves (114, 114'), into a chamber (108);
   at least one vertical set screw (106);
   the threaded body (112) having two inserts in order to be able to house a moisturetight sleeve seal (102), and another moisturetight seal (103) of the casing-sleeve-screw in order to create a moisturetight volume between the casing (101) and the threaded body (112);
   the body (112) also having at its outer top portion a threaded portion in order to be able of mounting a locknut (110) having at least four non-through holes (111), which perform the function of tightening the locknut (104) with a hook wrench;
   the threaded body (112) having a variable number of pressure chambers (108), which communicate with the casing (101), whose inner part houses a collar (105) that performs the function of moisturetight collar and also of screw heads;
   a tempered anti-extrusion washer (104) adjusted to the pressure chamber (108) which is located between the collar (105) and the set screw (106);
   the set screw (106) which upon being threaded moves forward the collar (105) and the washer (104), compressing hydraulic fluid passing from a chamber (108) into a general chamber formed by the casing (101) and the threaded body (112), stretching the screw where the hydraulic wrench is coupled, while moving forward a micropiston (127) which in turn raises the contact thrust shaft (129).

* * * * *